UNITED STATES PATENT OFFICE.

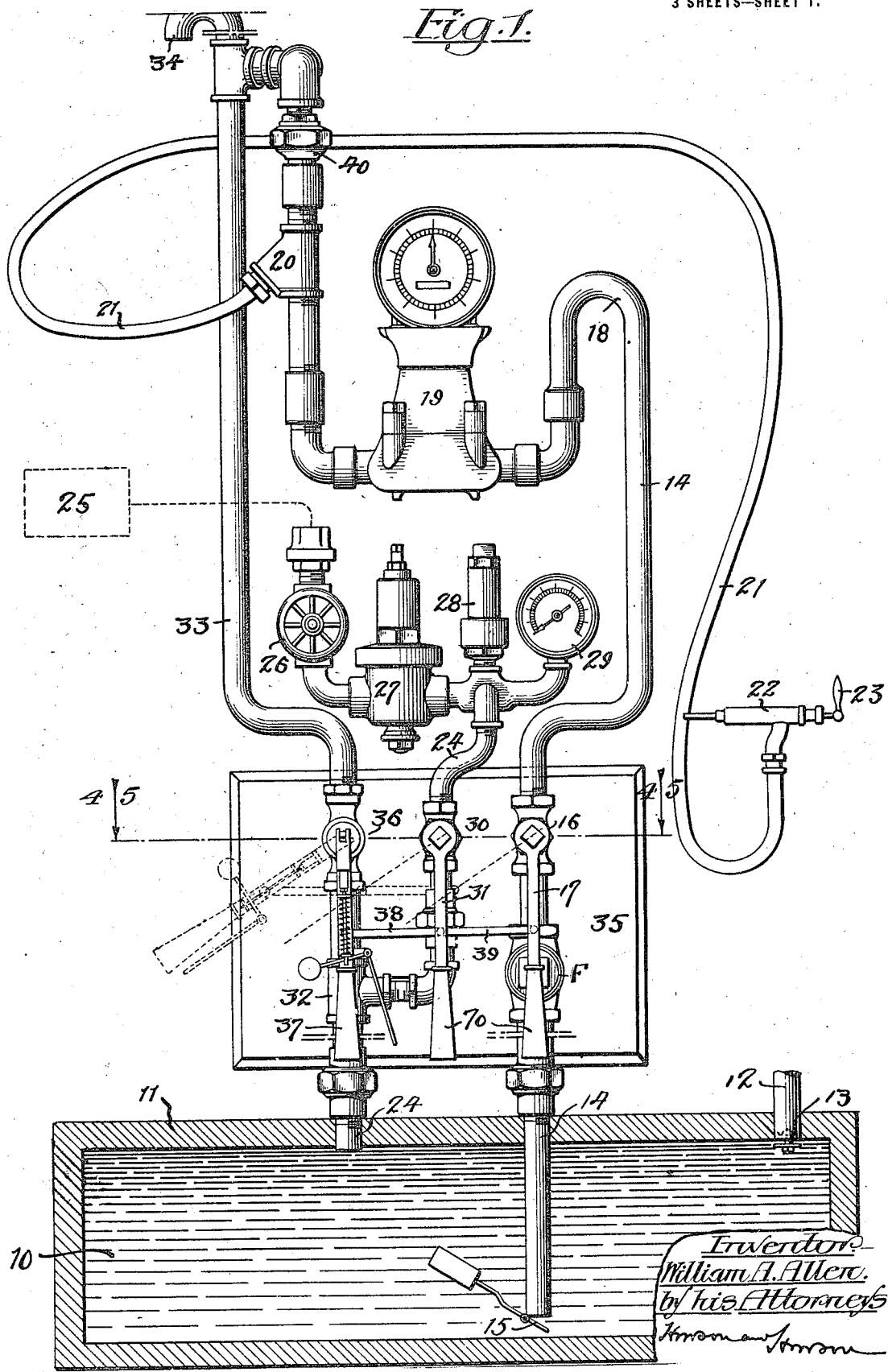

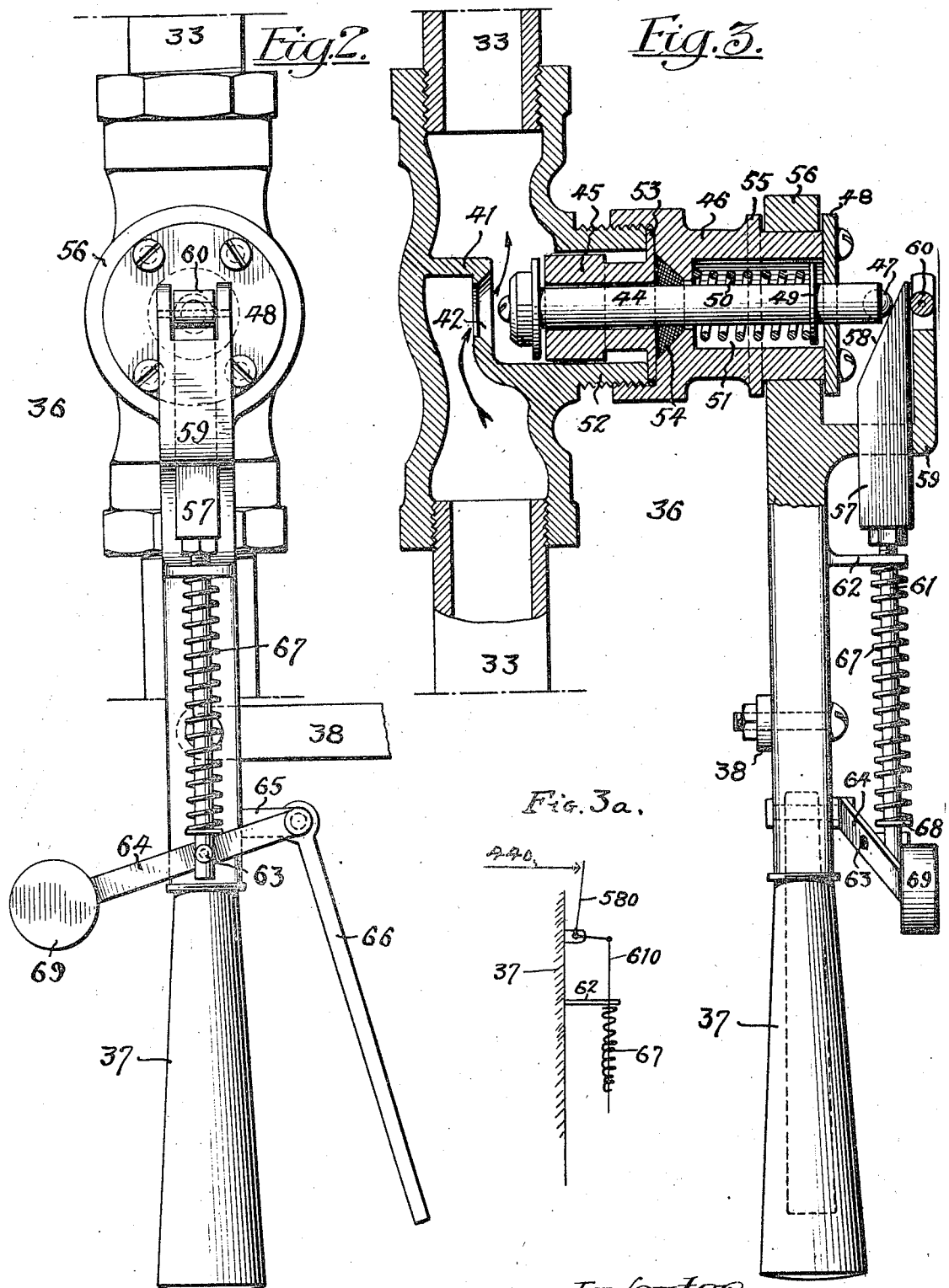

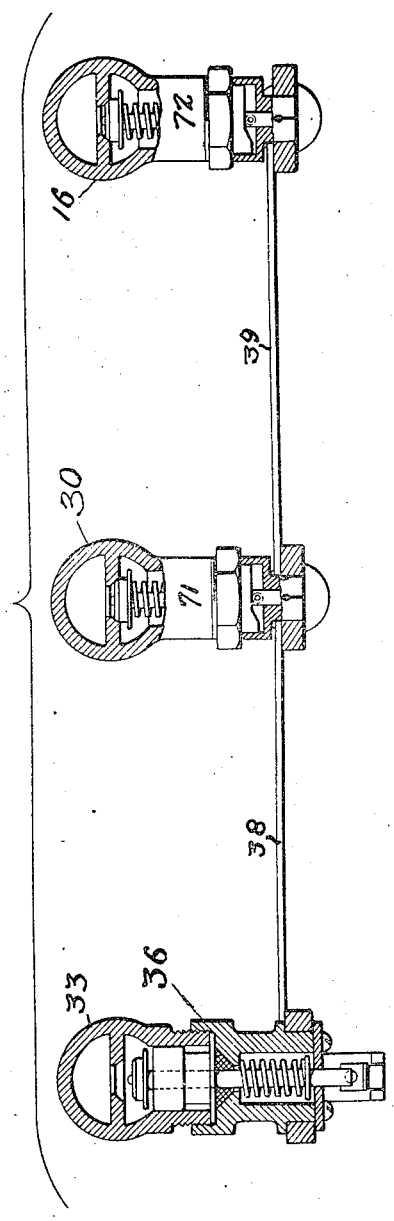
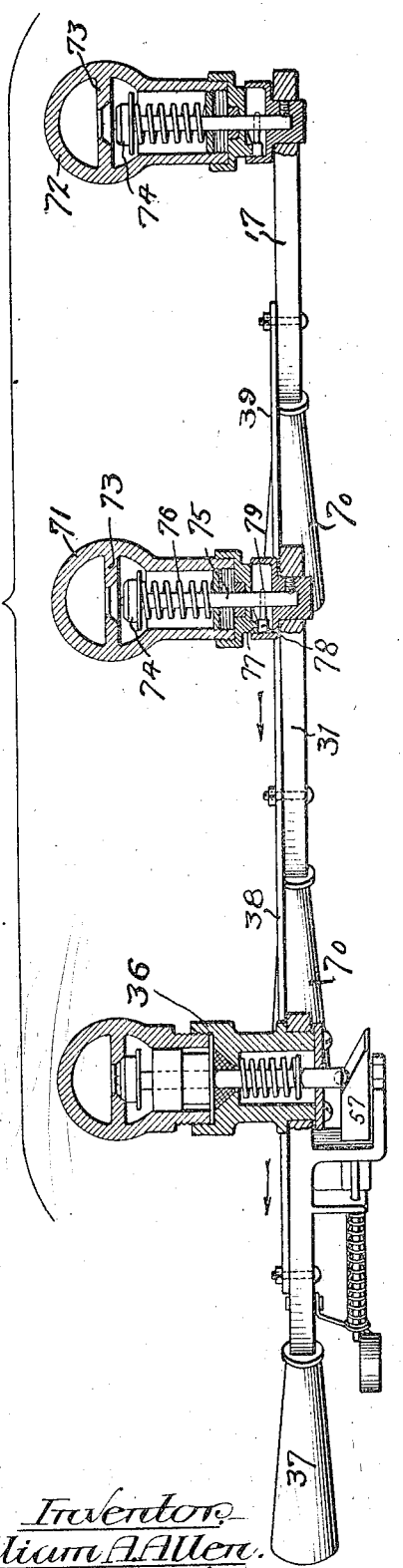

WILLIAM A. ALLEN, OF NEW YORK, N. Y., ASSIGNOR TO ALLEN PRESSURE SYSTEM COMPANY, INC., OF NEW YORK, N. Y., A CORPORATION OF NEW YORK.

DISPENSING SYSTEM.

1,237,144.  Specification of Letters Patent.  Patented Aug. 14, 1917.

Application filed October 18, 1916. Serial No. 126,365.

*To all whom it may concern:*

Be it known that I, WILLIAM A. ALLEN, a citizen of the United States of America, and residing in the city, county, and State of New York, have invented a certain new and Improved Dispensing System, of which the following is a specification.

The present invention relates to dispensing systems and particularly to systems for dispensing inflammable or explosive liquids such as gasolene, the object of my invention being to provide a system which is simple, reliable and efficient and provided with means for preventing accidental waste or overflow of the liquid or the confinement of dangerous vapors, and having other safeguards, some of which are automatic in their operation, as will be more fully pointed out in the following specification and shown in the accompanying drawings, in which—

Figure 1 is a more or less diagrammatic elevation of a dispensing system in which my invention is embodied in one form;

Fig. 2 is an enlarged front elevation of the operating lever and associated valve;

Fig. 3 is a side elevation thereof partially in section;

Fig. 3ª is a diagrammatic view of a modified form of control apparatus.

Fig. 4 is a horizontal section through the several valves, showing two of the latter in modified form with relation to those shown in Fig. 1; and Fig. 5 is a similar view showing the valve positions during the dispensing operation.

The system here shown is particularly designed for use in dispensing gasolene, but it is to be understood at the outset that the system may be equally well applied to dispensing other fluids. The gasolene 10 is preferably stored in a larger reservoir (not shown) from which it is led to the working tank 11 through a feed pipe 12 provided at any suitable point with a non-return valve 13 of common construction. The working tank has a capacity greater than is commonly required to meet a single ordinary draw therefrom, so that the liquid level therein will not ordinarily fall even near the lower end of the dispensing pipe 14 which opens adjacent the bottom of the tank. To provide against the possibility of the liquid level falling below the pipe end, the latter is provided with a float valve 15 which closes on the fall of the float and while the pipe end is still submerged.

Above the tank the pipe 14 is provided with a filter F in advance of the valve 16 which may be of the ordinary plug type, operated by a lever 17. Rising from the valve 16, the dispensing pipe is provided with a gooseneck return bend 18 leading to the meter 19 beyond which it is provided with a Y-fitting 20 to one branch of which the flexible hose 21 with its nozzle 22 is attached. The latter may also have a local valve 23 to prevent drippage from the hose after the supply from the tank is cut off by the main valve 16.

A pressure pipe 24 opens to the top of the tank and leads thereto a supply of air, or gas, or inert gaseous mixture, under pressure from any suitable source, indicated diagrammatically at 25. The line is provided with a gate valve 26 for cutting off the supply of compressed air in case of failure in any part of the system as a whole. A pressure reducer 27 is employed in this line, as also a safety-valve 28, and pressure gage 29. At one point the line is arranged adjacent the dispensing pipe 14 and a controlling plug valve 30 inserted. The latter may be of the same type as the valve 16 and operated by a lever 31.

Branched from the pressure line 24 at the T-fitting 32 is a vent pipe 33 leading to some safe place of discharge, preferably above the roof, at which point the terminal U-bend 34 is provided. The vent line is also run adjacent the pressure and dispensing lines at the control board 35, and is there provided with a normally open valve 36 (better shown in Figs. 2 and 3 hereinafter referred to). On the head of the valve fitting is pivoted the control lever 37 which is connected by links 38, 39, with the operating levers so that upon manipulation of lever 37 the valves 16 and 30 may be operated in unison. It is obvious that since the valve 36 is normally open any vapors which may rise from the tank 11 are free to escape harmlessly through the vent pipe. Furthermore, through an extension of the dispensing line 14 past a one-way valve 40 to the vent pipe 33, vapors arising from the gasolene retained in the hose 21 and adjacent parts of the line are also led to the vent line and there is consequently no danger of accumulation of vapor in the hose to be forced out therethrough on the next draw from the working tank.

Turning to Figs. 2 and 3 the particular construction of the normally open valve 36 in the vent line is here shown in greater detail. It comprises a T-fitting the opposite arms of which are internally threaded to receive the ends of adjacent sections of the vent pipe 33 and provided with an intermediate web 41 with valve aperture 42, coned to form a suitable seat for the valve proper 43. The stem 44 of the latter passes through a guide 45 and cap 46 and carries at its outer end an antifriction ball 47 which projects beyond the cover plate 48. Beneath the cover plate a washer 49 is mounted on the stem and bears against the outer end of the spring 50 which is confined between said washer and the bottom of the well 51 formed in the cap piece. The cap piece is threaded on the hub 52 of the T-fitting and clamps the flange 53 of the guide 45 thus holding the latter in position. A packing chamber 54 is afforded by a beveled annular recess in the face of the cap piece surrounding the valve stem 44 and adjacent the guide 45. An annular channel at the outer end of the cap piece is formed on the one hand by the flange 55, and on the other by the cover plate 48. In this channel works the eye 56 of the control lever 37 on which is mounted the means for operating the valve 43. This means comprises a slide block 57 having a cam face 58 which bears against the roller 47 in the outer end of the stem 44. A guide lug 59 supports the block 57 and carries an anti-friction roller 60 at a point in line with the valve stem 44 and against which the opposite face of the block bears. Extending from one end of the block is a rod 61 which passes through a guide lug 62 and is jointed at 63 to one arm 64 of a bell crank lever supported on lug 65 and having a long arm 66 extending in proximity to the handle of the control lever 37. A coil spring 67 bears at one end against the lug 62 and is held constantly under compression by the washer 68 on the stem 61 so that it constantly tends to return the slide block 57 to the position shown in Fig. 3 in which the valve 43 is opened by its spring 50. In order to provide against failure of the spring 67, the arm 64 of the bell crank lever may carry a weight 69 the effort of which is in the same direction as that of the spring 67 and constantly tends to withdraw the slide 57 so as to permit the valve 43 to open.

The operation of the system will be readily understood from the foregoing description. Under normal conditions the valves 16 and 30 in the dispensing and pressure lines respectively are closed, while the valve 36 in the vent line is open. If it is desired to draw liquid from the tank 10 the operator grasps the handle of the control lever 37 automatically drawing the arm 66 of the bell crank lever in toward the handle of lever 37 and thereby closing the valve 43 through the action of the cam face 38 of the slide block 57. The valve in the vent line 33 is thus closed before the valves 16 and 30 are opened. If the control lever 37 be now swung to the left, (as indicated in dotted lines, Fig. 1), these valves are opened, while the slide block 58 merely swivels on the ball bearing 47 and maintains the vent valve 43 closed. Pressure being now admitted to the tank through the pipe 24 and prevented from escape through the vent 33 by the closed valve 43, the liquid 10 is forced out through the dispensing pipe 14 to the nozzle 22. When the draw is finished the operator swings the operating lever 37 down to normal position closing valves 16 and 30. As he lets go of the handle the bell crank lever 66 is freed and the counterweight 69 and spring 67 withdraw the cam slide 57 so that the valve 43 opens automatically under the action of its spring 50. The pressure in the tank is at once relieved through the vent 33. Some liquid remains in the tubing 21 and in the remainder of the dispensing line beyond the valve 16. It is desirable to retain that in the piping through the meter, but to draw that in the hose 21. As soon as the pressure on the liquid in the dispensing pipe is cut off, the valve 40, which is of the one-way type similar to that at 13, opens and permits the liquid in the tubing 21 to run out without affecting the column in the piping beyond the Y-fitting 20. Similarly the valve 13 opens and the working tank fills again through 12 from the reservoir (not shown). It may be pointed out that a second advantage of connecting the dispensing pipe 14 with the vent beyond the valve 40 is to return any liquid which leaks past the valve 40 to the tank 11 through the vent pipe 33 instead of permitting it to be lost or give off dangerous vapors in the dispensing chamber.

One feature of safety which will be readily recognized and commend itself, is the provision of means for automatically halting the draw from the tank in case the operator leaves the control lever unattended. The moment this lever is released the spring 67 or weight 69 withdraws the slide block 57 and valve 43 opens, irrespective of the position of the valves 16 and 30, under the influence of the pressure in pipe 33 from the tank 11 as well as under the pressure of its own spring 50. Consequently, the pressure on the liquid in tank 11 is at once relieved, since the compressed air or gas, entering through open valve 30, passes out through the now open vent pipe, and delivery of the liquid through 14 at once ceases.

If the friction at the plug valves 16 and 30 is not so great as to make counterweighting the levers 17 and 31 objectionably burdensome, they may be extended as shown and provided with heavy handles 70 which, on release of the control lever 37, serve to automatically return the valves to closed position. The weight of the control lever 37 itself assists in this movement.

It is obvious that the system will operate in precisely the same fashion if the pressure pipe 24 is extended down directly to the tank 11 instead of being branched from the vent pipe 33. The latter arrangement is merely one of convenience.

Similarly the valve 43 may be operated by any other suitable connection instead of by the cam 58. For instance, as shown in Fig. 3ª, a bell crank lever 580 may be used, one arm bearing on the end of the valve stem 440 and the other arm connecting with the connecting rod 610 from the operating lever 66. Such an arrangement would have the advantage over the cam 58 of exerting a more direct axial thrust on the valve stem, thus lessening the wear and tendency to bind against the side of the hole in the cover plate 48, as well as rendering unnecessary the expense of the antifriction ball 47 and roller 60.

In the modification shown in Figs. 4 and 5, the valves 16 and 30 are of the self-closing type. Each valve fitting 71 and 72 has a web 73 similar to that of valve 36, and the valve proper is of the same type, having a head 74 carried by a stem 75. In this construction, however, the spring 76 normally exerts closing pressure on the valve, and the latter is held open positively by the cam 77 on which rides the roller 78 carried by the pin 79 fast with the valve stem. In this case there is practically no friction for the counterweights 70 to overcome so that on release of the operating handle 37 the valve levers 17 and 31 will readily swing down under the influence of the counterweights, permitting the springs 76 to close the valves.

The system presents an efficient arrangement in which the valve devices are simple, readily accessible for repair or renewal of packing, washers, etc., automatically stopping the draw upon inattention by the operator, ventilating the tank and liquid pipes when not in use, permitting the purchaser to draw practically all the liquid which passes the meter, providing against leakage or loss from leakage, and as a whole, affording a simple, economical, approved dispensing system having features of safety and certainty not hitherto attained. Doubtless various modifications in detail of construction and arrangement of parts will readily occur to those skilled in the art without departing from what I claim as my invention.

I claim as my invention:—

1. In a liquid dispensing system, a working tank for the liquid, a dispensing line, a pressure line and a vent line all communicating therewith, normally closed valves in the dispensing and pressure lines, a normally open valve in the vent line, a control lever for operating the pressure and dispensing line valves, and means associated with said lever for operating the vent line valve irrespective of the position of said control lever.

2. In a liquid dispensing system, a working tank for the liquid, a dispensing line, a pressure line and a vent line all communicating therewith, normally closed valves in the dispensing and pressure lines, a normally open valve in the vent line, a control lever for operating the pressure and dispensing line valves, and means carried by said control lever for operating, independent of the latter, the vent line valve.

3. In a liquid dispensing system, a working tank for the liquid, a dispensing line, a pressure line and a vent line all communicating therewith, normally closed valves in the dispensing and pressure lines, a normally open valve in the vent line, a control lever for operating the pressure and dispensing line valves, and a lever pivoted to said control lever but serving to operate, independent of the latter, the vent line valve.

4. In a liquid dispensing system, a working tank for the liquid, a dispensing line, a pressure line and a vent line all communicating therewith, normally closed valves in the dispensing and pressure lines, a normally open valve in the vent line, a control lever for operating the pressure and dispensing line valves, and means associated with said lever for closing the vent line valve, and spring means for opening said vent line valve on the release of said closing means.

5. In a liquid dispensing system, a working tank for the liquid, a dispensing line, a pressure line and a vent line all communicating therewith, normally closed valves in the dispensing and pressure lines, a normally open valve in the vent line, and means for closing said valve in the vent line and opening the valves in the pressure and dispensing lines to draw liquid from the tank, together with means tending to return said several valves to their normal positions on the release of the means for moving the same to position for discharge from the tank.

6. In a liquid dispensing system, a working tank for the liquid, a dispensing line, a pressure line and a vent line all communicating therewith, normally closed valves in the dispensing and pressure lines, a meter in the dispensing line, a branch connecting said dispensing line beyond the meter with the vent line and a one-way valve in said branch connection for permitting the flow of liquid from the dispensing line beyond the branch after the flow through the meter is halted.

7. In a liquid dispensing system, a working tank for the liquid, a dispensing line, a pressure line and a vent line all communicating therewith, normally closed valves in the dispensing and pressure lines, a normally open valve in the vent line, and means for closing said valve in the vent line and opening the valves in the pressure and dispensing lines to draw liquid from the tank, together with a float valve in the tank closing admission to the dispensing line on the fall of the liquid level in the tank but while the admission port to the dispensing line is still submerged.

In testimony whereof I have signed my name to this specification, in the presence of two subscribing witnesses.

WILLIAM A. ALLEN.

Witnesses:
F. A. HAINES,
T. V. MAHON.